(12) United States Patent
Childs et al.

(10) Patent No.: US 11,037,474 B2
(45) Date of Patent: *Jun. 15, 2021

(54) MAGNETIC INTERCONNECTED DISPLAY PANELS

(71) Applicant: Vomela Specialty Company, Inc., St. Paul, MN (US)

(72) Inventors: Barry Childs, Hastings, MN (US); Robert Pietila, Burlingame, CA (US)

(73) Assignee: Vomela Specialty Co., Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,500

(22) Filed: Oct. 17, 2018

(65) Prior Publication Data

US 2019/0114135 A1 Apr. 18, 2019

Related U.S. Application Data

(60) Provisional application No. 62/573,377, filed on Oct. 17, 2017.

(51) Int. Cl.
| | | |
|---|---|---|
| *G09F 15/00* | (2006.01) | |
| *G06F 1/16* | (2006.01) | |
| *G06F 3/14* | (2006.01) | |
| *H01R 13/62* | (2006.01) | |
| *G09F 7/18* | (2006.01) | |

(52) U.S. Cl.
CPC ........ *G09F 15/0068* (2013.01); *G06F 1/1637* (2013.01); *G06F 3/1446* (2013.01); *G09F 15/0012* (2013.01); *G09F 15/0056* (2013.01); *H01R 13/6205* (2013.01); *G09F 2007/1852* (2013.01)

(58) Field of Classification Search
CPC ............. G09F 15/0068; G09F 15/0012; G09F 15/0056; G09F 7/04; G09F 2007/1852
See application file for complete search history.

(56) References Cited

U.S. PATENT DOCUMENTS

| | | | | |
|---|---|---|---|---|
| 3,942,147 | A * | 3/1976 | Josephson | G09F 7/04 335/285 |
| 4,531,564 | A * | 7/1985 | Hanna | E04B 2/7405 160/229.1 |
| 4,741,534 | A * | 5/1988 | Rogahn | A63F 9/1204 273/157 R |
| 5,412,918 | A * | 5/1995 | Wendel | E04B 1/6108 403/13 |
| 7,020,993 | B2 | 4/2006 | Pritchard | |
| 7,770,313 | B2 | 8/2010 | Fritsche | |
| 8,056,738 | B2 | 11/2011 | Phillips | |
| 8,763,289 | B2 | 7/2014 | Childs et al. | |
| 8,807,193 | B2 | 8/2014 | Zarelius | |
| 8,991,083 | B1 * | 3/2015 | Pohlman, Jr. | G09F 7/04 40/600 |
| 9,015,974 | B2 | 4/2015 | Valentine et al. | |

(Continued)

*Primary Examiner* — Gary C Hoge
(74) *Attorney, Agent, or Firm* — Haugen Law Firm PLLP

(57) ABSTRACT

A panel board display system is described that includes a plurality of thin interconnected display panels. The interconnected display panels are capable of interconnecting at a lengthwise edge of each panel without overlap. The interconnected display panels are easily coupled together magnetically and may be coupled in multiple varied orientations utilizing various combinations of the front and back of each panel.

16 Claims, 12 Drawing Sheets

(56) References Cited

U.S. PATENT DOCUMENTS

| | | |
|---|---|---|
| 9,069,239 B2 | 6/2015 | Zarelius |
| 9,271,609 B2 | 3/2016 | Karalius |
| 9,277,813 B2 | 3/2016 | Nelson et al. |
| 9,723,732 B2 | 8/2017 | van der Walde |
| 9,728,110 B2 | 8/2017 | Taylor et al. |
| 2002/0097978 A1 | 7/2002 | Lowry et al. |
| 2008/0121599 A1 | 5/2008 | Korse |
| 2010/0265668 A1* | 10/2010 | Yuen .................. G09F 7/04 361/736 |
| 2012/0044031 A1 | 2/2012 | Ninomiya |

* cited by examiner

MAGNETIC INTERCONNECTED DISPLAY PANELS

CROSS-REFERENCE TO RELATED APPLICATIONS

This application claims priority to U.S. Provisional Patent Application Ser. No. 62/573,377, filed on Oct. 17, 2017, the contents of which are being incorporated herein by reference in their entirety.

FEDERAL SPONSORSHIP

Not Applicable

JOINT RESEARCH AGREEMENT

Not Applicable

TECHNICAL FIELD

The present invention relates generally to portable exhibit displays, and more particularly relates to a segmented display that utilizes a plurality of thin interconnected display panels. The interconnected display panels of the invention are capable of interconnecting at the lengthwise edges of the panels without overlap and may include print or indicia on both the front and back of each panel. The interconnected display panels of the invention are easily coupled together magnetically and may be coupled in multiple varied orientations utilizing various combinations of the front and back of each panel.

BACKGROUND

Exhibit displays for meetings, trade shows, and other events typically include structures that are easily transported and erected for the intended temporary usage. Such portable exhibit displays may commonly employ a network of interconnected frame members to form a support frame onto which a fabric or modular covering overlays the support frame. Other displays or printed sheets may be hung from this framework. Although the modular covering may include printing or indicia, the covering is typically secured to the framework in a manner that does not allow a quick interchange between the front and back of the covering.

In the past, thin foam core board or poster board has been utilized to provide a disposable display that is easily printed upon or otherwise utilized to display photos or other indicia. Both the front and back may be written or printed upon, however, the thinness of the board has restricted the ability to efficiently interconnect multiple poster board in a manner that leaves a seamless appearance without overlap. Further, it may be desirable to increase the image size or font size beyond the dimensional limits of a single foam core board. Also, it may be desirable to mix and match the messages or indicia printed on the front and back of multiple poster boards. Although prior poster boards may be positioned adjacent to each other the poster board is easily disturbed to reveal seams or gaps between adjacent poster boards. It is desirable to provide a cost effective disposable display that may be segmented while preserving a seamless appearance.

SUMMARY

Embodiments according to aspects of the invention provide a display panel capable of interconnecting side by side with another similar display panel to form an interconnected multiple segmented display without gaps (seams) or overlap. According to other aspects, the display panels of the invention includes a coupling system that allows foam core board to be coupled together along a lengthwise edge while allowing a user to choose whether to display a front or back of each of the foam core boards. These and other embodiments according to aspects of the invention include a display for interconnecting multiple segmented display panel boards together. Each display panel of the invention includes a foam core board having first and second spaced apart longitudinal side edges and top and bottom edges extending between the first and second longitudinal side edges. The foam core board includes spaced apart front and back poster sheets interconnected together with a foam core.

Each foam core board further includes a series of pockets or slits carved into the foam core, wherein the pockets extend into the foam core from the outer edge of the foam core. The pockets or slits are sized to accept a permanent magnet within the pocket. The permanent magnets are held in place in the pocket with an adhesive. The polarity of the magnets used and orientation of the poles may be strategically chosen dependent upon the display requirements. By way of example all magnets on a first longitudinal side edge may have a north pole of the magnet facing out from the pocket and all magnets on the second longitudinal side edge may have a south pole of the magnet facing out from the pocket. In this manner, the matching north and south edges of multiple boards may easily align and couple the board together without a gap or overlap. Alternatively, the polarity of adjacent magnets along a side edge may be staggered between north and south poles. In this manner, the magnets will naturally more precisely vertically align the coupling boards. Similarly, the polarity facing out from the pockets on the top and bottom edges may be either all north poles, all south poles, or staggered between north and south poles.

In use, multiple coupled display boards may be hung from the framework of a wall, display, or exhibit. A hanging member or wire may be coupled to each display panel individually or to the opposing ends of multiple coupled panels. Further the display panels may be oriented so that the length of the panel either spans along a vertical or horizontal plane. Those skilled in the art will further appreciate that, much like a jig saw puzzle, each panel may have a portion of an entire picture or other indicia printed on the panel. For example, when four display panels are used, each of the four display panels may have a subset of the picture or indicia such that when the four panels are properly aligned the panels together form a single unitary picture or indicia.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Figure 1:
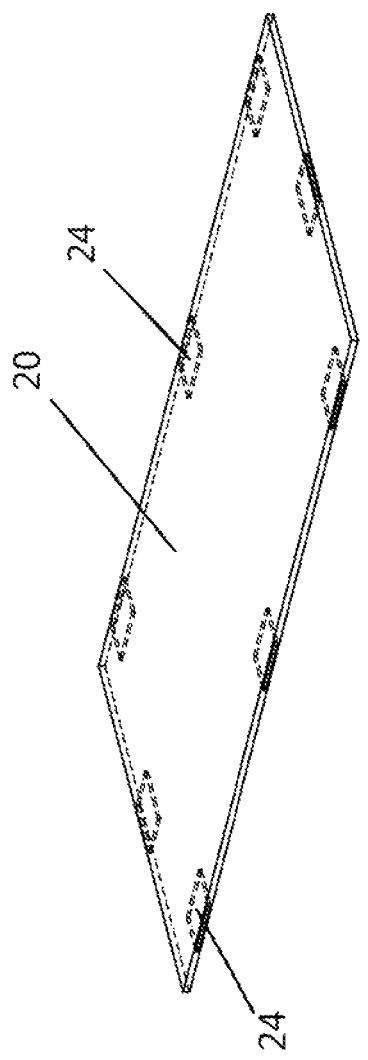
FIG. 1 is a front upper perspective view of a thin display panel of the present invention shown with eight magnet receiving pockets.
Figure 2:
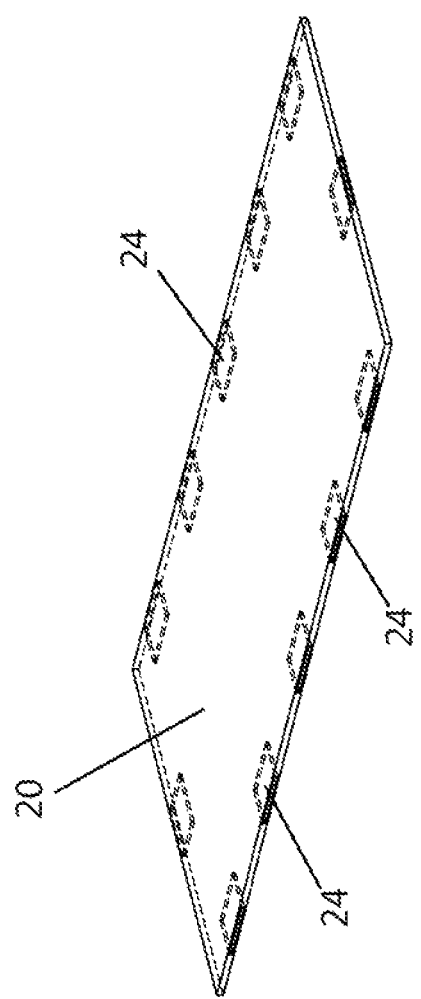
FIG. 2 is a front upper perspective view of a thin display panel of the present invention shown with twelve magnet receiving pockets.

The display panel 20 of the present invention is particularly well suited for interconnecting with a plurality of panels to form a magnetically interconnected display 10. The present invention is further particularly well suited to eliminate gaps or overlap in display panels. With reference to the Figures, various embodiments according to aspects of the invention will be described in greater detail. With reference to FIG. 1 a thin flat foam core board or display panel 20 having 8 carve out recesses or pockets 24 adapted for receiving permanent magnets 40 is illustrated. Similarly FIG. 2 illustrates a thin flat foam core board or display panel 20 having 12 carve out recesses or pockets 24 adapted for receiving permanent magnets 40. The pockets are spaced apart and extend into the foam core 30 between the front and back poster board sheets 32 and 34. The N or S designated on each magnet 40 in the Figures indicates the poles and polarity of the magnet at the adjacent edge of the display panel 20.

Without any limitation intended and by way of example, the foam core board may be 40 inches long, 30 inches wide and 3/16 inches thick. Each pocket 24 extending into the foam core may have a length of 2 inches, a depth extending into the foam of 5/8 inch and a thickness of 1/16 inches. Of course the size of the pocket will be dependent upon the size of the permanent magnet. In the preferred embodiment a Neodymium permanent magnet is utilized having a magnetization direction along the width of the magnet when the magnet measure 1½ inches long, ½ inch wide and 1/16 inch thick. Other equally suited permanent magnets are readily available having a magnetization along the width wherein the length may range from 1-3 inches, the width ranging from ½-1 inch and a thickness ranging from 1/16-¼ inch. Those skilled in the art will appreciate that foam core board is available in many different sizes that may be equally incorporated into the invention. The spacing of the pockets and number of pockets carved into the foam core will depend upon the overall size of the foam core or poster board.

Figure 3:
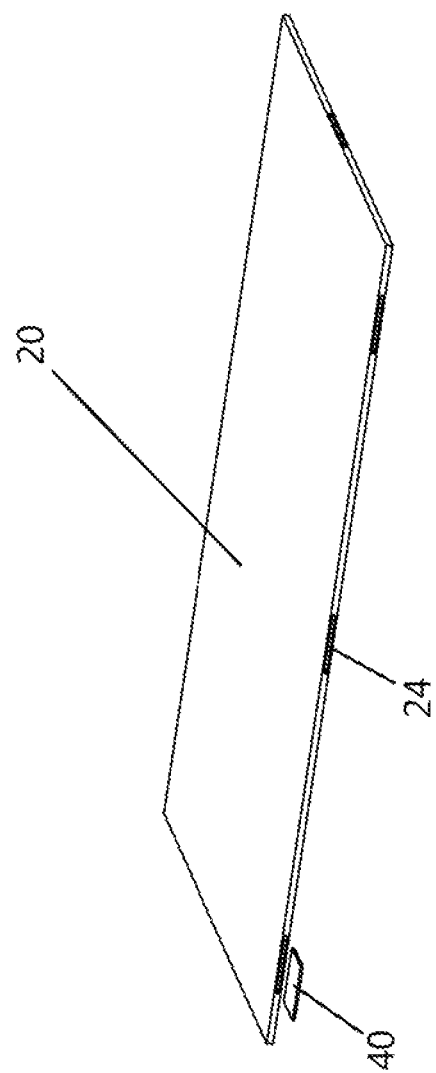
FIG. 3 is a front upper perspective view of the thin display panel of the type shown in FIG. 1 having a thin magnet aligned with a magnet receiving pocket.
Figure 4:
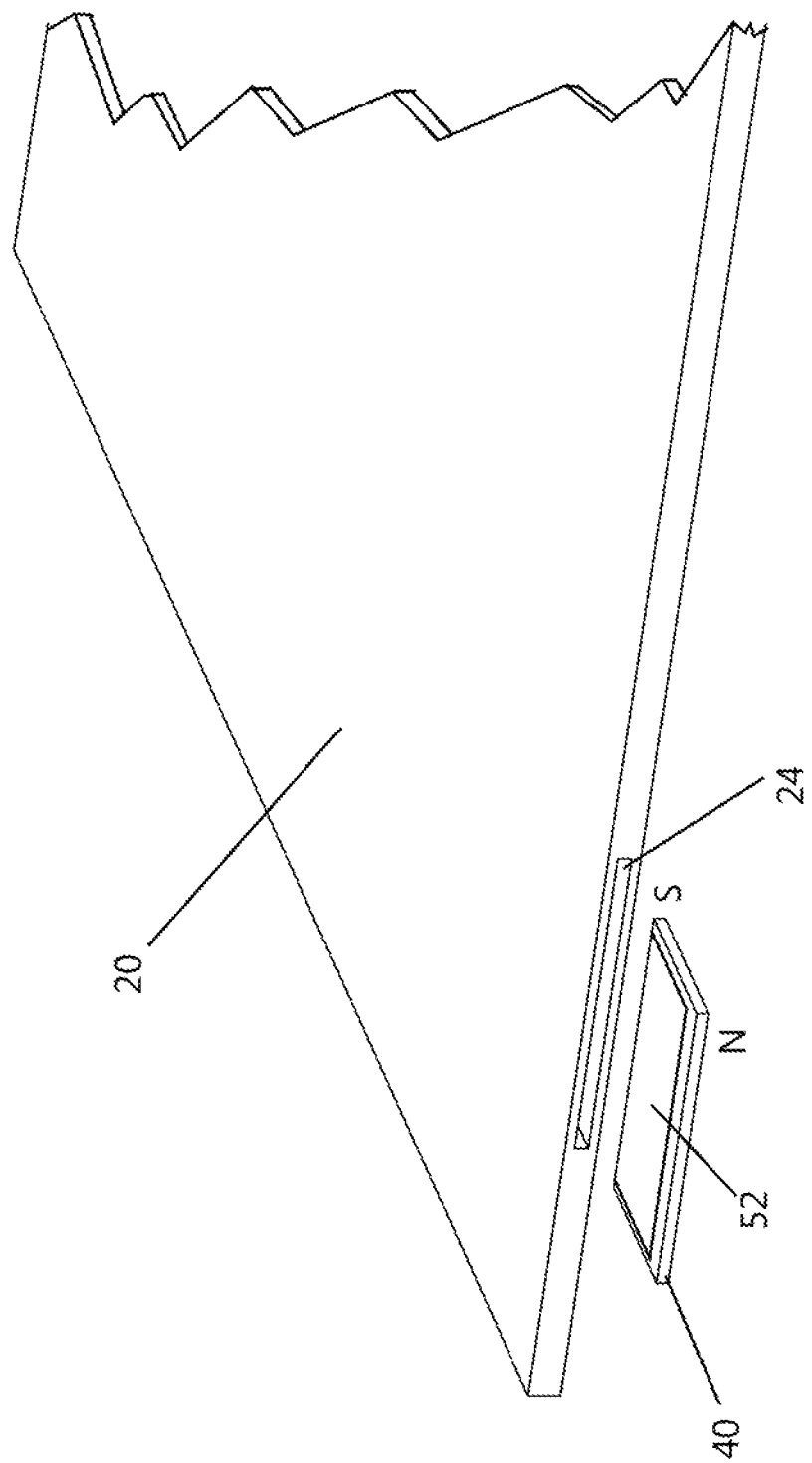
FIG. 4 is a partial sectional perspective view of the thin display panel of the type shown in FIG. 3 illustrating a thin magnet aligned with a magnet receiving pocket.
Figure 5:
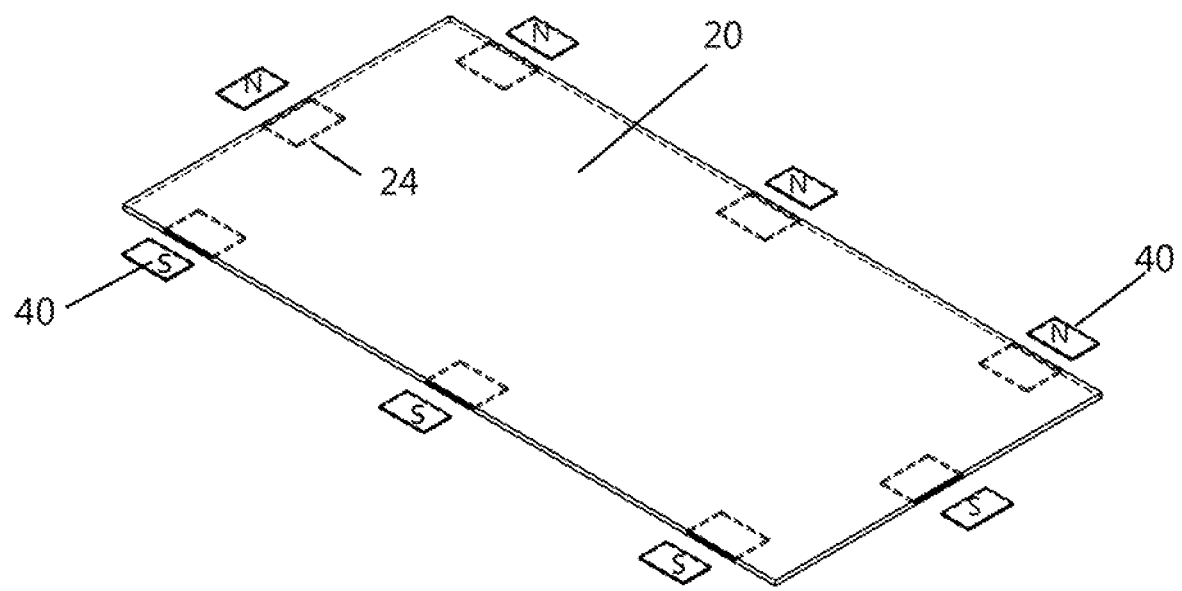
FIG. 5 is a front upper perspective view of a thin display panel of the present invention having eight thin magnets aligned with eight magnet receiving pockets.

FIGS. 3-5 illustrate a magnet ready for insertion and adherence within pocket 34. In an embodiment of the invention two sided adhesive tape 52 is applied to the magnet and then the magnet is slipped into the pocket. The adhesive tape may be applied to one or both of the flat surfaces of the magnet 40. Once in the pocket the surface of the poster sheet adjacent the magnet 40 and adhesive tape 52 is pressed. In this manner, the adhesive tape adheres to the internal side of the pocket 24 thereby retaining the magnet within the pocket. The adhesive properties of the tape provide enough tack to overcome the magnetic forces of a second magnet when separating two coupled magnets. One such two sided adhesive tape is available from Minnesota Mining and Manufacturing Company and sold under the product name 300LSE.

Figure 6:
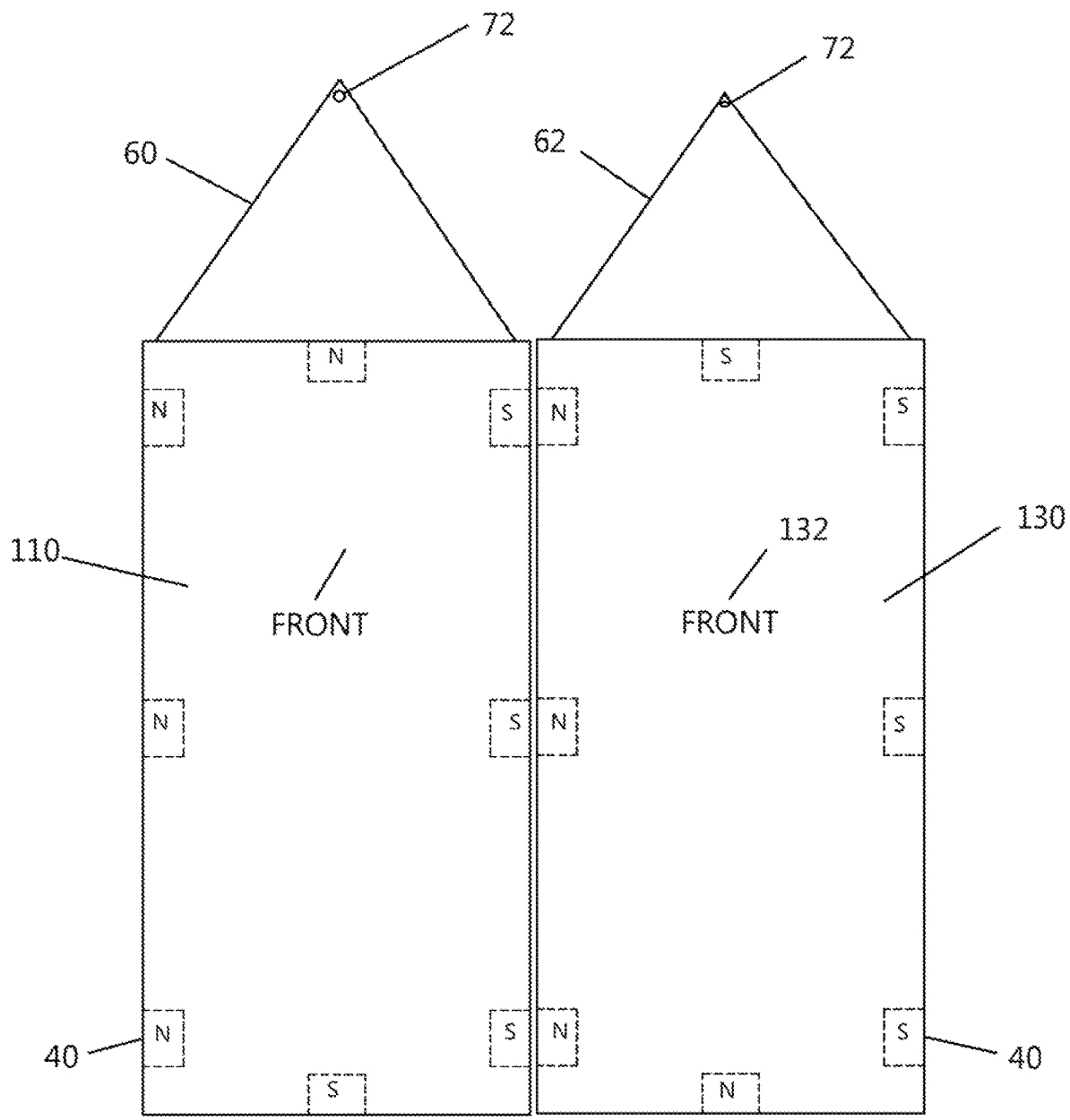
FIG. 6 is a front view of multiple hanging and magnetically interconnected thin display panels of the present invention.

FIG. 6 illustrates a first display panel 110 coupled to a second display panel 130. Hanging wire 60 is coupled to display panel 110 and hanging wire 62 is coupled to display panel 130. Each display panel is hung from a peg 72 that may be engaged to an exhibit display, wall, or other surface. Display panel 110 includes an array of magnets 40 magnetized through the width of the magnet. The magnets aligned on the edge adjacent panel 130 have the N pole facing out towards panel 130. Display panel 130 includes an array of magnets 40 magnetized through the width of the magnet. The magnets aligned on the edge adjacent panel 110 have the S pole facing outwards towards display panel 110. In this manner, as the opposing edges of panel 110 and panel 130 are brought together, the magnets draw the panels together into coupling engagement that eliminates a gap between the panels. The edges contact each other but do not overlap each other. In this embodiment the front 112 of panel 110 is displayed and the front 132 of panel 130 is displayed. To couple the backs of the panels together, each panel is flipped along the length axis of the panel.

Figure 7:
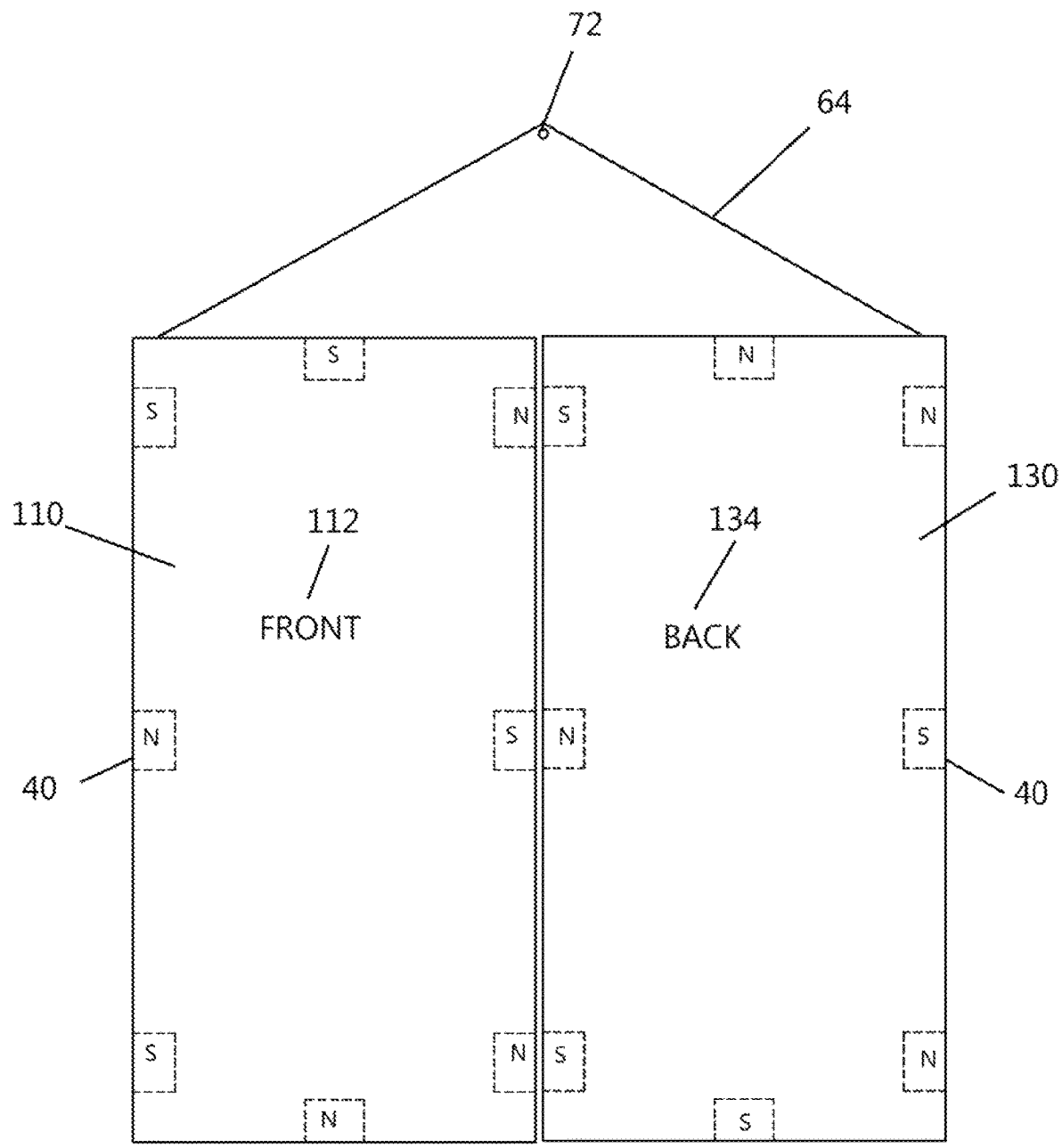
FIG. 7 is a front view of multiple hanging and magnetically interconnected thin display panels of the present invention.

FIG. 7 illustrates a first display panel 110 coupled to a second display panel 130. A free end of hanging wire 64 is coupled to display panel 110 and the opposite free end of hanging wire 64 is coupled to display panel 130. Together the display panels are hung from a peg 72 that may be engaged to an exhibit display, wall, or other surface. Display panel 110 includes an array of magnets 40 magnetized through the width of the magnet. The magnets aligned on the edge adjacent panel 130 have alternating the N and S pole facing out towards panel 130. Display panel 130 includes an array of magnets 40 magnetized through the width of the magnet. The magnets aligned on the edge adjacent panel 110 have and alternating the S and N pole facing outwards towards display panel 110. In this manner, as the opposing edges of panel 110 and panel 130 are brought together, the magnets draw the panels together into coupling engagement that eliminates a gap between the panels. The edges contact each other but do not overlap each other. The alternating or staggered poles provide an additional alignment feature of the panels. In this embodiment the front 112 of panel 110 is displayed and the back 134 of panel 130 is displayed. To couple the front 132 of panel 130, the panel is flipped along the width axis.

Figure 8:
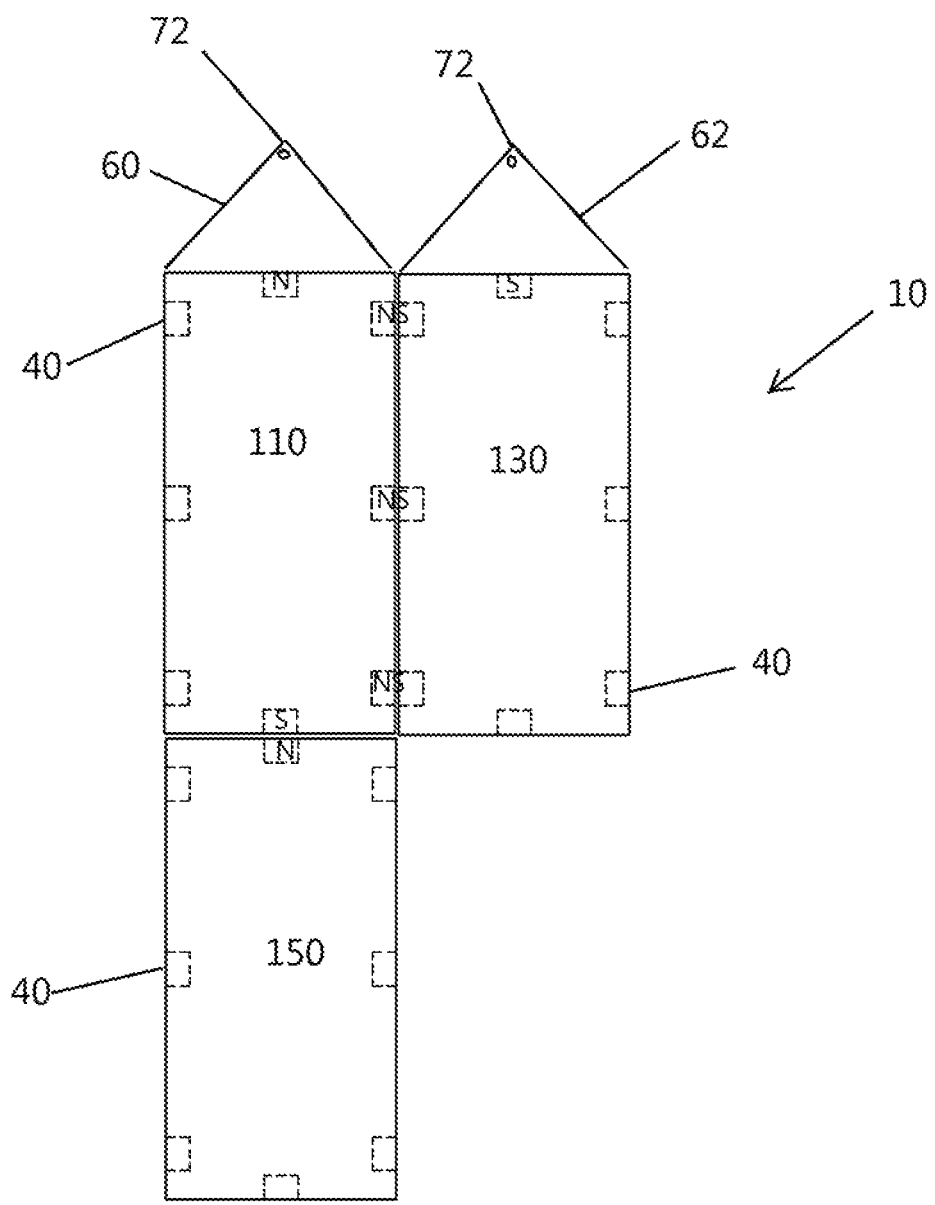
FIG. 8 is a front view of multiple hanging and magnetically interconnected thin display panels of the present invention.

FIG. 8 illustrates a first display panel 110 coupled to a second display panel 130. Hanging wire 60 is coupled to display panel 110 and hanging wire 62 is coupled to display panel 130. Each display panel is hung from a peg 72 that may be engaged to an exhibit display, wall, or other surface. Display panel 110 includes an array of magnets 40 magnetized through the width of the magnet. The magnets aligned on the edge adjacent panel 130 have the N pole facing out towards panel 130. Display panel 130 includes an array of magnets 40 magnetized through the width of the magnet. The magnets aligned on the edge adjacent panel 110 have the S pole facing outwards towards display panel 110. In this manner, as the opposing edges of panel 110 and panel 130 are brought together, the magnets draw the panels together into coupling engagement that eliminates a gap between the panels. The edges contact each other but do not overlap each other. In this embodiment an additional third panel 150 is magnetically coupled to the bottom edge of panel 110.

Figure 9:
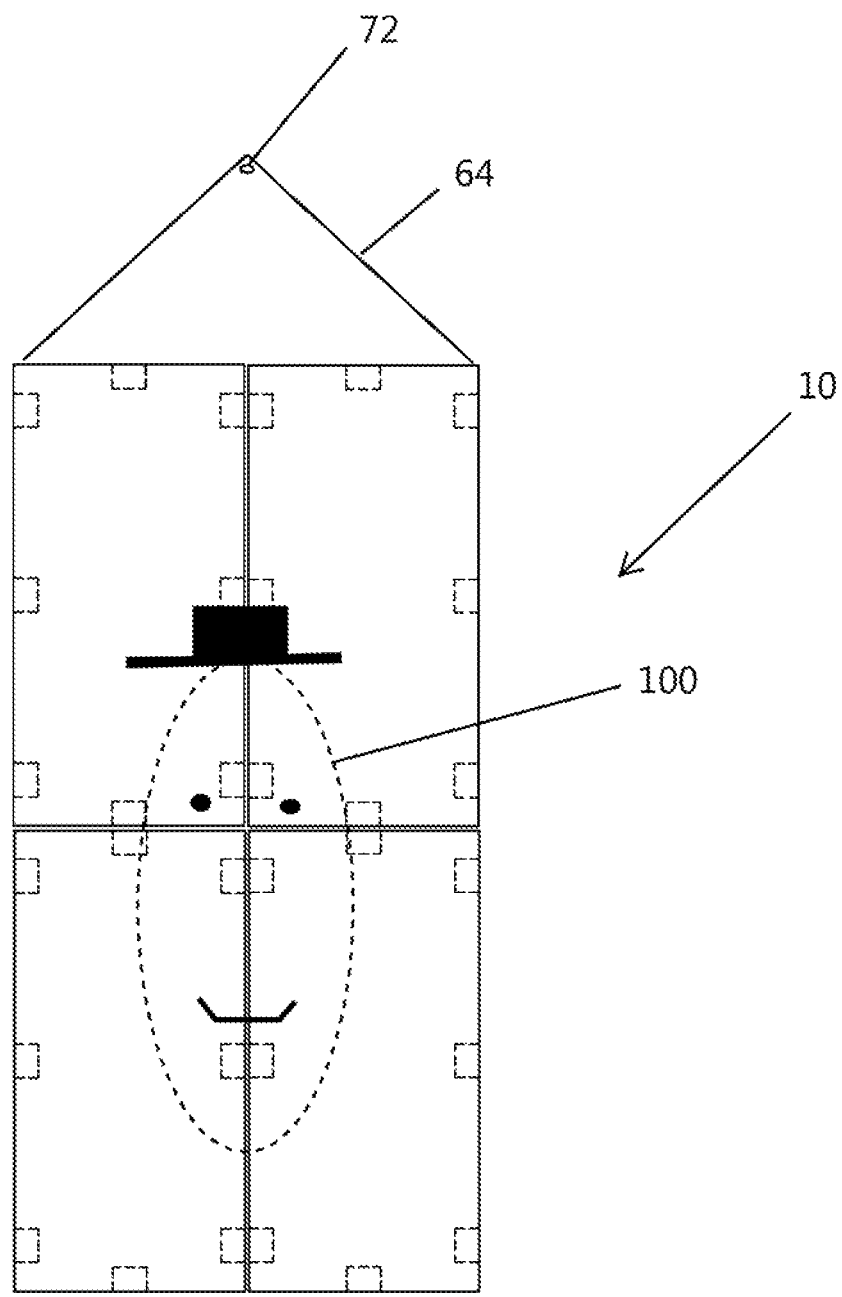
FIG. 9 is a front view of multiple hanging and magnetically interconnected thin display panels of the present invention.

FIG. 9 illustrates the combination of display panels 110, 130, 150 and 170 to form a segmented gapless non-overlapping display 10. A portion of image or indicia 100 is formed on each display panel. Once the display panels are properly aligned and arranged then the image 100 is comprehended.

Figure 10:
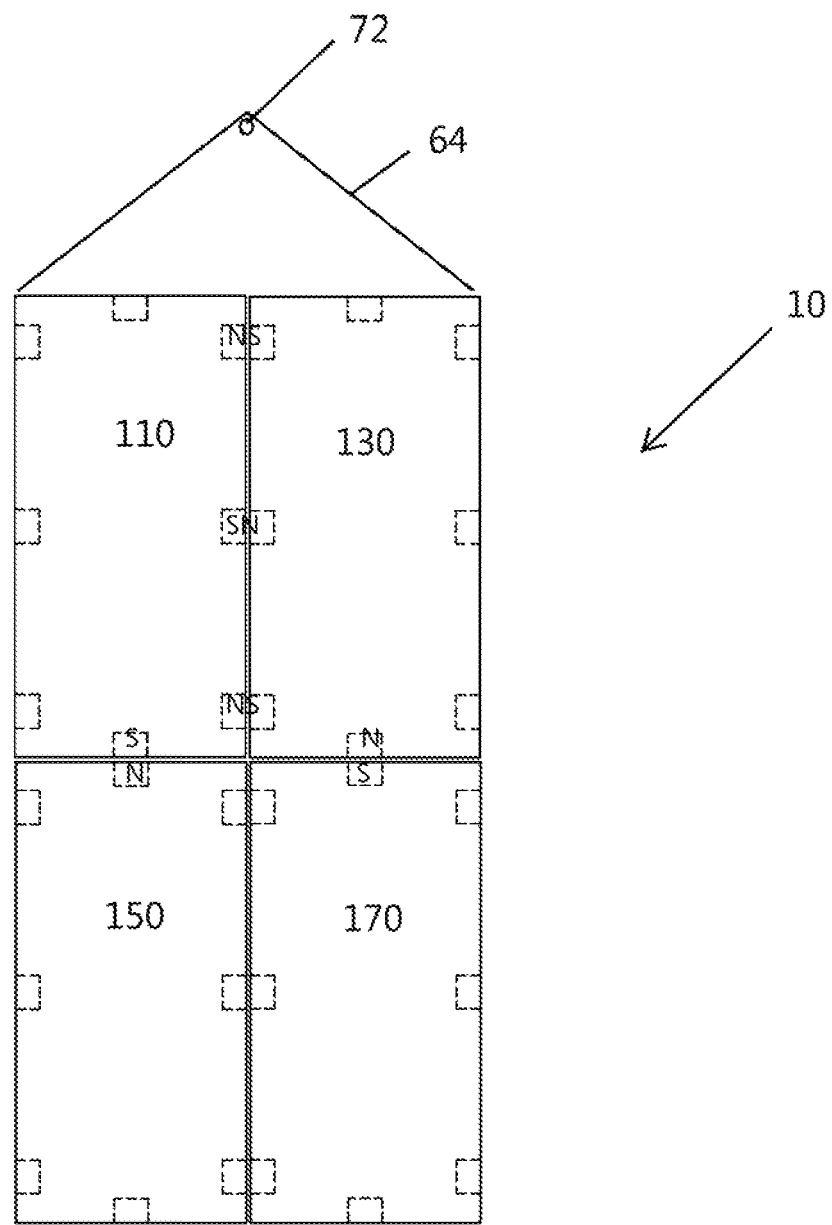
FIG. 10 is a front view of multiple hanging and magnetically interconnected thin display panels of the present invention.

FIG. 10 illustrates a first display panel 110 coupled to a second display panel 130. A free end of hanging wire 64 is coupled to display panel 110 and the opposite free end of hanging wire 64 is coupled to display panel 130. Together the display panels are hung from a peg 72 that may be engaged to an exhibit display, wall, or other surface. Display panel 110 includes an array of magnets 40 magnetized through the width of the magnet. The magnets aligned on the edge adjacent panel 130 have alternating the N and S pole facing out towards panel 130. Display panel 130 includes an array of magnets 40 magnetized through the width of the magnet. The magnets aligned on the edge adjacent panel 110 have and alternating the S and N pole facing outwards towards display panel 110. In this manner, as the opposing edges of panel 110 and panel 130 are brought together, the magnets draw the panels together into coupling engagement that eliminates a gap between the panels. The edges contact each other but do not overlap each other. The alternating or staggered poles provide an additional alignment feature of the panels. In this embodiment an additional third panel 150 is magnetically coupled to the bottom edge of panel 110 and a fourth panel 170 is magnetically coupled to the bottom edge of panel 130.

Figure 11:
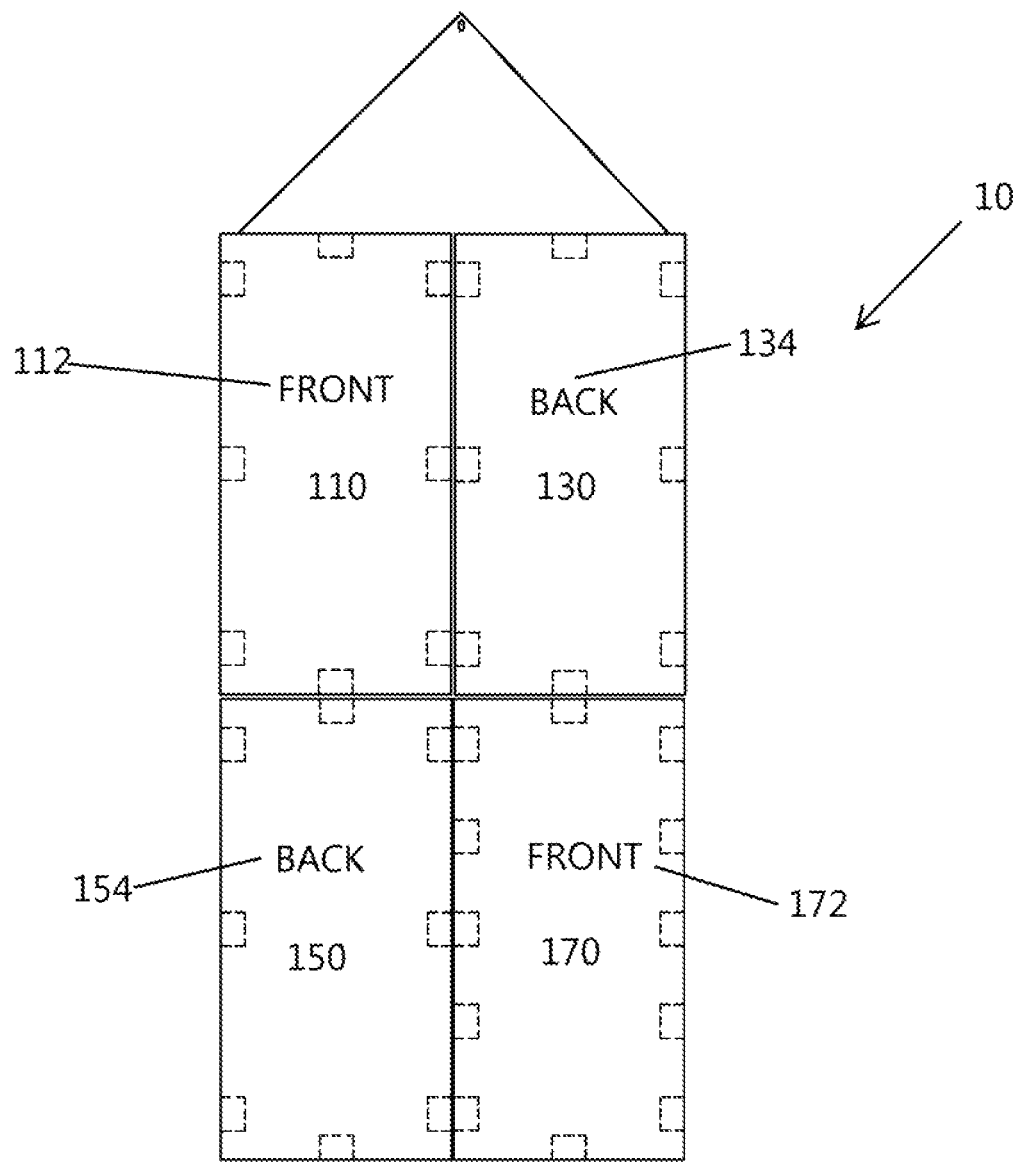
FIG. 11 is a front view of multiple hanging and magnetically interconnected thin display panels of the present invention.
Figure 12:
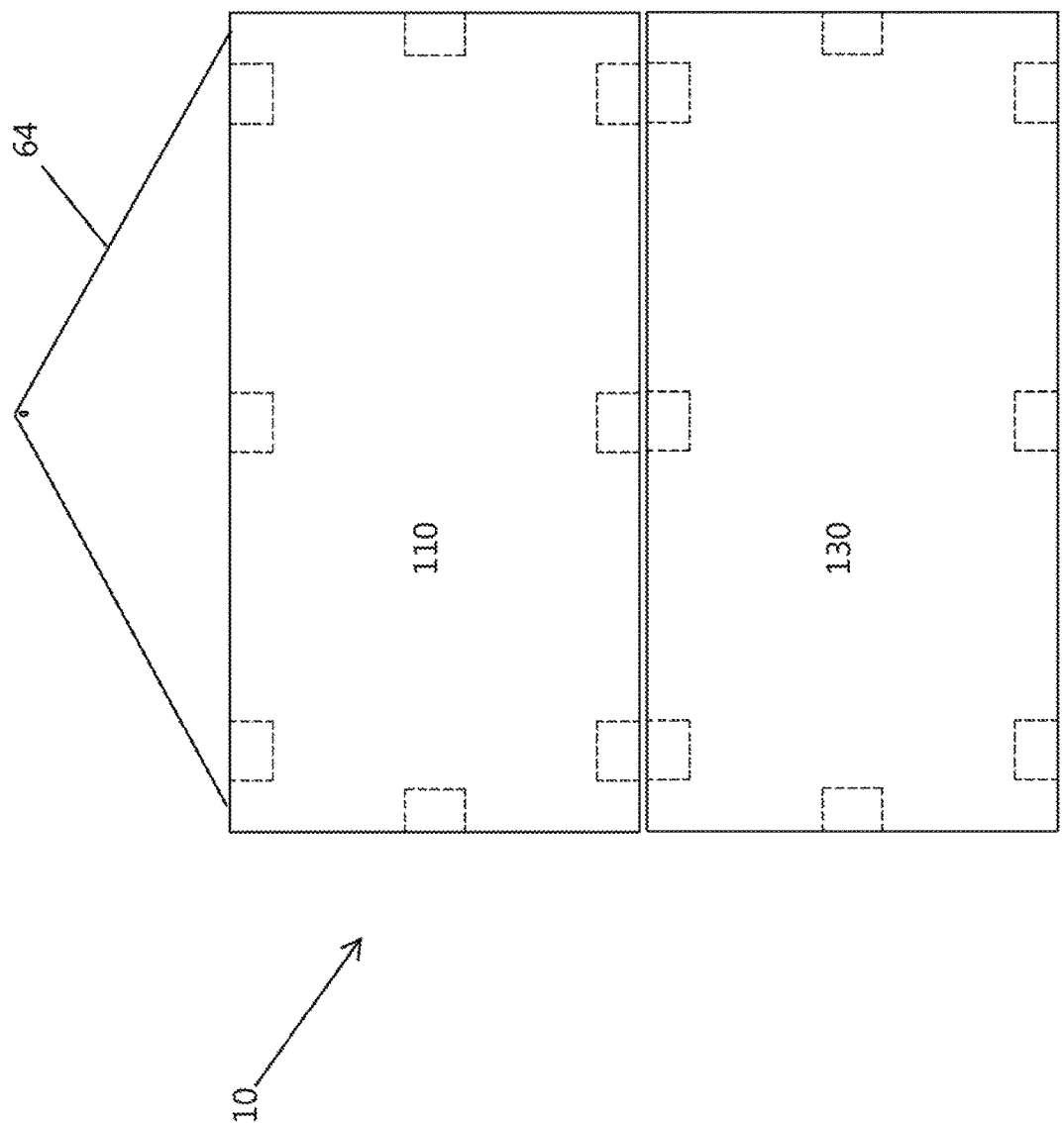
FIG. 12 is a front view of multiple hanging and magnetically interconnected thin display panels of the present invention.

FIG. 11 further illustrates an alternate embodiment showing an arrangement of the magnetic polarity of adjoining magnets together with the alignment of the front or back of each display panel 110, 130, 150 and 170. Specifically, the front 112 of panel 110, the back 134 of panel 130, the back 154 of panel 150 and the front 172 of panel 170 are shown magnetically coupled together to form the display 10. FIG. 12 illustrates an alternate embodiment where the lengthwise axis of display panels 110 and 130 are aligned with a horizontal plane. Display panel 130 is magnetically coupled to display panel 110 and is positioned below panel 110. Those skilled in the art will appreciate that many other orientations and combinations of panels are possible without departing from the scope of the invention.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A display panel for interconnecting multiple segmented display panel boards, the display panel comprising:
   a core board having first and second spaced apart longitudinal side edges and top and bottom edges extending between the first and second longitudinal side edges;
   wherein the core board includes spaced apart front and back sheets interconnected together with a core;
   at least one pocket or slit extending into the core from each of the first and second longitudinal side edges;
   a plurality of permanent magnets wherein each pocket or slit has a corresponding permanent magnet contained therein, wherein the permanent magnets are sized to fit within each pocket or slit;
   and
   a hanging member coupled to at least one of the top, bottom or side edges of the core board.

2. The display panel as recited in claim 1, wherein all magnets contained within pockets positioned on the first longitudinal edge have a north pole of the magnet facing out from the pocket and all magnets positioned on the second longitudinal edge have a south pole of the magnet facing out from the pocket.

3. The display panel as recited in claim 1, wherein magnets contained within pockets positioned on the first longitudinal edge have a pole of the magnet facing out from the pocket and the pole of each adjacent magnet is staggered between north and south poles.

4. The display panel as recited in claim 1, wherein magnets contained within pockets positioned on the second longitudinal edge have a pole of the magnet facing out from the pocket and the pole of each adjacent magnet is staggered between north and south poles.

5. The display panel as recited in claim 1, further including at least one pocket or slit extending into the core from each of the top and bottom edges and corresponding magnets contained within the pockets, wherein all magnets contained within pockets positioned on the top edge have a north pole of the magnet facing out from the pocket and all magnets contained within pockets positioned on the bottom edge have a south pole of the magnet facing out from the pocket.

6. The display panel as recited in claim 1, wherein the hanging member includes separate hanging wire for each display panel.

7. The display panel as recited in claim 1, wherein the hanging member includes a single hanging wire for at least two interconnected display panels.

8. The display panel as recited in claim 1, further including at least four display panels each having a subset of indicia such that when the four panels are properly aligned and coupled together the four panels form a single unitary whole of indicia.

9. A display panel for interconnecting multiple segmented display panel boards, the display panel comprising:
- at least two foam core boards, each foam core board having first and second spaced apart longitudinal side edges and top and bottom edges extending between the first and second longitudinal side edges;
- wherein each foam core board includes spaced apart front and back poster sheets interconnected together with a foam core;
- wherein each foam core board includes at least one pocket or slit extending into the foam core from each of the first and second longitudinal side edges and each of the top and bottom edges;
- wherein each foam core board includes a plurality of thin permanent magnets contained within each pocket or slit extending into the foam core, wherein each magnet is sized to fit within the corresponding pocket or slit; and
- a hanging member coupled to at least one of the top, bottom or side edges of at least two foam core boards.

10. The display panel as recited in claim 9, wherein all magnets contained within pockets positioned on the first longitudinal edge of each foam core board have a north pole of the magnet facing out from the pocket and all magnets positioned on the second longitudinal edge of each foam core board have a south pole of the magnet facing out from the pocket.

11. The display panel as recited in claim 9, wherein magnets contained within pockets positioned on the first longitudinal edge of each foam core board have a pole of the magnet facing out from the pocket and the pole of each adjacent magnet is staggered between north and south poles.

12. The display panel as recited in claim 9, wherein magnets contained within pockets positioned on the second longitudinal edge of each foam core board have a pole of the magnet facing out from the pocket and the pole of each adjacent magnet is staggered between north and south poles.

13. The display panel as recited in claim 9, wherein each foam core board further includes at least one pocket or slit extending into the foam core from each of the top and bottom edges and corresponding magnets contained within the pockets, wherein all magnets contained within pockets positioned on the top edge have a north pole of the magnet facing out from the pocket and all magnets contained within pockets positioned on the bottom edge have a south pole of the magnet facing out from the pocket.

14. The display panel as recited in claim 9, wherein the hanging member includes separate hanging wire for each display panel.

15. The display panel as recited in claim 9, wherein the hanging member includes a single hanging wire for at least three interconnected display panels.

16. The display panel as recited in claim 9, further including at least four display panels each having a subset of indicia such that when the four panels are properly aligned and coupled together the four panels form a single unitary whole of indicia.

\* \* \* \* \*